UNITED STATES PATENT OFFICE.

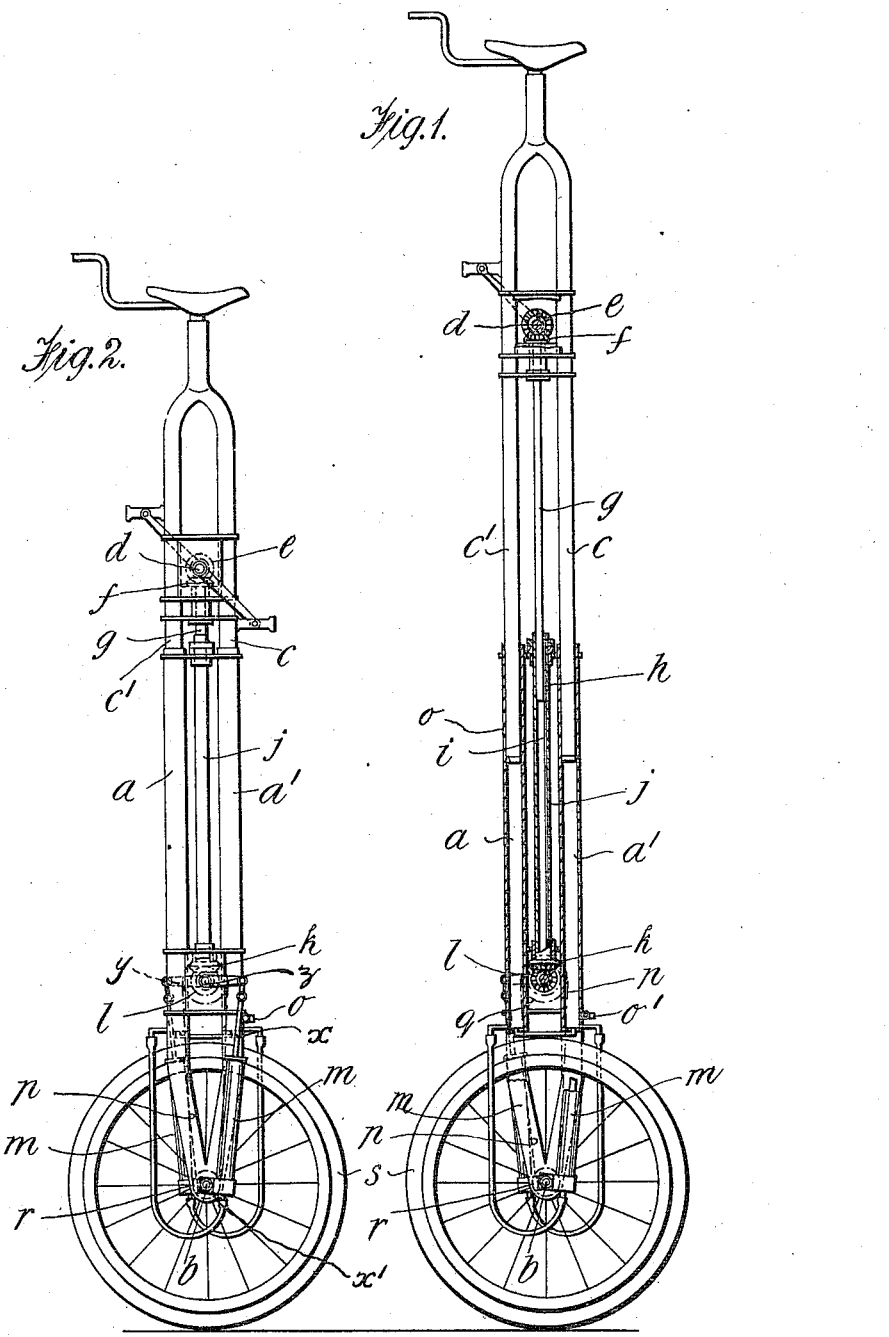

ARTHUR DELORAN ROBBINS, OF LONDON, ENGLAND.

CYCLE.

985,370.  Specification of Letters Patent. Patented Feb. 28, 1911.

Application filed October 21, 1909. Serial No. 523,888.

*To all whom it may concern:*

Be it known that I, ARTHUR DELORAN ROBBINS, a subject of the King of Great Britain and Ireland, and resident of London, county of London, England, have invented certain new and useful Improvements in and Relating to Cycles, of which the following is a specification.

This invention relates to cycles more especially designed for stage purposes and has for its essential feature to so construct and arrange the frame of the cycle that the same is capable of extension or contraction in a vertical plane while the rider is in the saddle. For this purpose the frame consists of upper and lower tubular members fitting one within the other, the upper members carrying the saddle while the lower are connected to the axle of the wheel in the usual manner.

To effect the rise of the upper members, the pedal axle is provided with a gear meshing with a gear carried by a vertical shaft which is also telescopic, the worm, i. e. the lifting and driving shaft entering into a milled race made to take the set off on the shaft which at its lower end is provided with a similar gear adapted to operate a pair of pumps which pump air or other fluid into the vertical members of the lower frame to cause the upper members to be forced upward, means such as exhaust valves or openings being provided to limit the upward movement of the upper members and their downward movement.

For a clear understanding of the present invention reference is to be had to the following description and accompanying sheet of drawings which illustrate the invention as applied to a unicycle.

In said drawings, $a$, $a'$ are the lower members mounted on axle $b$ in the usual manner, and $c$, $c'$ are the upper members fitting within said lower members, and $d$ is the pedal axle provided with gear $e$ engaging gear $f$ on vertical shaft $g$. This shaft $g$ at its lower end is provided with a feather $h$ engaging in a slot $i$ in the vertical shaft $j$ which at its lower end is provided with the gear $k$ engaging gear $l$ operating the pumps $m$ which force air or other liquid into the members $a$, $a'$ and so raise the upper members $c$, $c'$. The pumps $m$ may be operated by means of any suitable operative connection between the pump pistons and the shaft of the gear $l$, such for instance as shown in the drawings, viz: by having the piston rod $x$ of each pump pivotally connected with a crank arm $y$ fitted at one end to the shaft $z$ upon which is mounted the gear $l$, the rotation of said shaft causing the crank arm to be swung in a circle and thereby reciprocate the pump piston, the barrels or cylinders of the pumps having a pivotal mounting at their lower ends as at $x'$. To limit the upward movement of the lower members suitable openings $o$—Fig. 2—are provided to allow air or other fluid to escape, and further exhaust valves $o'$ may be arranged in the lower part of the members $a$, $a'$ to permit of the descent of the upper members.

$p$ is the chain passing over sprocket $q$ and $r$ for driving the wheel $s$.

Having now described my invention, what I claim as new and desire to secure by Letters Patent of the United States is:—

1. A cycle of the class described comprising a wheel, a frame secured to the wheel and formed of vertical tubular members telescopically engaged, and means controlled by the rider for adjusting the frame by extending or contracting the said members.

2. A cycle of the class described comprising a wheel, a frame secured to the wheel and formed of vertical tubular members telescopically engaged, and pneumatic means controlled by the rider for adjusting the frame by extending or contracting the said members.

3. A cycle of the class described comprising a wheel, a frame secured to the wheel and formed of vertical tubular members telescopically engaged, and pneumatic means for adjusting the frame by extending or contracting the said members, said means comprising a pump, a connection between the pump and one of the members, and means controlled by the rider for operating the pump.

4. A cycle of the class described comprising a wheel, a frame formed of vertical tubular members telescopically engaged, and a screw-threaded shaft engaging both members of the frame and controlled by the rider for adjusting the said frame by extending or contracting the said member.

In testimony whereof I have affixed my signature.

ARTHUR DELORAN ROBBINS.

In presence of—
   ROBT. HUNTER,
   H. BUBB.

---

Copies of this patent may be obtained for five cents each, by addressing the "Commissioner of Patents, Washington, D. C."